United States Patent
Katou et al.

(10) Patent No.: US 8,836,265 B2
(45) Date of Patent: Sep. 16, 2014

(54) NUMERICAL CONTROL DEVICE

(75) Inventors: Aya Katou, Tokyo (JP); Yoshinori Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 442 days.

(21) Appl. No.: 13/257,819

(22) PCT Filed: Mar. 31, 2009

(86) PCT No.: PCT/JP2009/001470
§ 371 (c)(1),
(2), (4) Date: Sep. 20, 2011

(87) PCT Pub. No.: WO2010/113204
PCT Pub. Date: Oct. 7, 2010

(65) Prior Publication Data
US 2012/0007539 A1 Jan. 12, 2012

(51) Int. Cl.
*G05B 19/18* (2006.01)
*G05B 19/404* (2006.01)

(52) U.S. Cl.
CPC .................... *G05B 19/404* (2013.01)
USPC ........... 318/569; 318/560; 318/571; 318/594; 318/721

(58) Field of Classification Search
CPC ................................. G05B 19/19; H02P 6/16
USPC ......... 318/560, 565, 567, 571, 705, 721, 799, 318/437, 400.01, 400.39, 400.4, 568.22, 318/430, 569, 594; 700/159, 173, 192, 193, 700/186
See application file for complete search history.

(56) References Cited

U.S. PATENT DOCUMENTS

| 5,144,214 | A | | 9/1992 | Komatsu et al. |
| 5,373,220 | A | | 12/1994 | Tomoguchi |
| 5,517,097 | A | * | 5/1996 | Hayashida ............... 318/568.22 |
| 7,123,984 | B2 | * | 10/2006 | Tanaka ........................ 700/193 |
| 7,613,541 | B2 | * | 11/2009 | Mizukami et al. ............ 700/193 |

(Continued)

FOREIGN PATENT DOCUMENTS

| JP | 59-232750 A | 12/1984 |
| JP | 60-228020 A | 11/1985 |

(Continued)

OTHER PUBLICATIONS

International Search Report (PCT/ISA/210) issued on Jun. 2, 2009 in the International Patent Application No. PCT/JP2009/001470.

(Continued)

*Primary Examiner* — Antony M Paul
(74) *Attorney, Agent, or Firm* — Sughrue Mion, PLLC; Richard C. Turner

(57) ABSTRACT

In order to obtain an NC device that can easily shift by an arbitrary amount a main spindle single-revolution reference signal without being dependant on hardware and while rotating a main spindle, the NC device includes a main spindle reference angle correction amount setting unit for inputting a correction angle of a reference point, a main spindle within-single-revolution feed-back position correction unit for correcting the reference point by a correction angle set by the main spindle reference angle correction amount setting unit, and a main spindle within-single-revolution command position correction unit for correcting a main spindle within-single-revolution command position by the correction angle set by the main spindle reference angle correction amount setting unit.

3 Claims, 10 Drawing Sheets

(56) References Cited

U.S. PATENT DOCUMENTS

| | | |
|---|---|---|
| 2006/0047357 A1 | 3/2006 | Tanaka et al. |
| 2009/0228135 A1 | 9/2009 | Nakamura |
| 2010/0185310 A1 | 7/2010 | Miyata et al. |

FOREIGN PATENT DOCUMENTS

| | | |
|---|---|---|
| JP | 2-309401 A | 12/1990 |
| JP | 4-310314 A | 11/1992 |
| JP | 5-341823 A | 12/1993 |
| JP | 10-166222 A | 6/1998 |
| JP | 2005-202844 A | 7/2005 |
| TW | 325099 I | 5/2010 |
| TW | 353497 I | 12/2011 |
| WO | 2004/069459 A1 | 8/2004 |

OTHER PUBLICATIONS

Written Opinion (PCT/ISA/237) issued on Jun. 2, 2009 in International Patent Application No. PCT/JP2009/001470.

"Concise Statement of Relevancy Between the Invention and Materials", 2 pages total.

Communication issued on Mar. 13, 2012 by the Japanese Patent Office in the counterpart Japanese Patent Application No. 2011-506837.

Office Action dated Jan. 11, 2013 issued by the Taiwanese Patent Office in counterpart Taiwanese Patent Application No. 098111786.

* cited by examiner

NUMERICAL CONTROL DEVICE

TECHNICAL FIELD

The present invention relates to a numerical control (hereinafter referred to as NC) device and particularly to main spindle control of screw cutting, zero return, phase matching, or the like, which executes a program in accordance with a main spindle within-single-revolution reference point which is determined by a main spindle single-revolution reference signal (hereinafter referred to as a Z-phase signal) that is a physical signal which is used in zero return such as positioning, and that generates one pulse per revolution.

BACKGROUND ART

In screw cutting control in an existing NC device, movement control is performed by constantly rotating a main spindle which holds a work piece, detecting passage of a main spindle within-single-revolution reference point (hereinafter referred to as a Z-phase) by the input of a Z-phase signal from an encoder mounted on the main spindle, and calculating a movement amount of a screw cutting spindle that is proportional to an instructed screw lead, with respect to a rotation amount of the main spindle from the Z-phase passage.

FIG. 8 illustrates an existing NC device in which such screw cutting control or the like is possible, and this NC device is constituted by a signal processing section 2, a display unit 14, a screen display processing section 15, a memory 16 that stores a processing program or the like, an analysis processing section 18, an interpolation processing section 8, a screw cutting control section 9, a main spindle synchronization control section 10, a synchronization tapping control section 11, a main spindle C-axis control section 12, an orientation/indexing control section 13, a main spindle control section 19, a main spindle motor 20, a main spindle encoder 21, a spindle control section 22, a servomotor 23, an encoder 24, a main spindle feed-back position counter 31 (hereinafter referred to as a main spindle FB position counter), a main spindle Z-phase counter 32, and so on.

The main spindle encoder 21 is a position detector that outputs a position pulse which is counted by rotations of a main spindle. Further, the main spindle encoder 21 outputs a Z-phase signal when a Z-phase passes through a sensor of a detector. The main spindle control section 19 accumulates the position pulse from the main spindle encoder 21 and creates the main spindle FB position counter 31, as shown in FIG. 10. In addition, the main spindle FB position counter 31 repeats accumulation of pulses and clearing. Also, when the Z-phase signal has been input, the main spindle FB position counter 31 is latched and the main spindle Z-phase counter is created. When the NC device executes a screw cutting command program, the screw cutting control section 9 awaits the starting of screw cutting block until the main spindle passes through the Z-phase, and controls the angle of the main spindle that starts screw cutting. In addition, a counter as mentioned herein unit data counted by a counter (not shown).

Specifically, Z-phase passage is recognized by a change in the value of the main spindle Z-phase counter 32 and a rotation amount of the main spindle at the first Z-phase passage is calculated from a difference between the main spindle FB position counter 31 and the main spindle Z-phase counter 32. Thereafter, a variation of the main spindle FB position counter 31 is accumulated and a rotation amount of the main spindle from the first Z-phase passage after a screw cutting command is calculated. A movement amount of a screw cutting spindle that is proportional to an instructed screw cutting lead is calculated with respect to the rotation amount of the main spindle from the Z-phase passage, and the interpolation processing section 8 controls a movement amount of a servomotor in synchronization with the rotation amount of the main spindle, thereby performing processing from a given angle of a work piece gripped by the main spindle, whereby screw cutting can be performed.

Also, the main spindle synchronization control section 10 synchronously controls speeds and phases of two opposed main spindles. The synchronization tapping control section 11 synchronously controls the main spindle that rotates a tapping tool, and a tapping spindle, thereby performing tapping processing. Also, before the tapping processing, it is also possible to perform zero return of the main spindle to a Z-phase position, thereby performing phase matching.

Also, the main spindle C-axis control section 12 switches the main spindle to a C-axis that performs position control, and performs movement control with respect to a command of positioning or the like. In addition, when switching the main spindle to C-axis control, a coordinate system of the C-axis is established by performing zero return of the main spindle to the Z-phase position.

Also, the orientation/indexing control section 13 performs positioning of the main spindle at a given command angle by an orientation/indexing command.

In addition, in the case of performing the respective operations of main spindle synchronization control, synchronization tapping control, C-axis control, and orientation/indexing control, the operations are performed by performing setting or command of an angle matching a phase, by parameters or a processing program.

Also, the existing NC device can give instructions of a shift angle of screw cutting by the processing program 17. FIG. 9 illustrates a configuration particularly about the screw cutting control section 9 in the NC device of FIG. 8. The screw cutting control section 9 of FIG. 9 recognizes Z-phase passage by a change in the value of the main spindle Z-phase counter 32 and calculates a rotation amount of the main spindle from the Z-phase passage, from a difference between the main spindle FB position counter 31 and the main spindle Z-phase counter 32. The phase shift control section 7 subtracts the rotation amount of the main spindle from the Z-phase passage, from a shift angle amount of screw cutting instructed by the processing program 17 and calculates a rotation amount of the main spindle from a point of time when the shift angle amount reaches 0. The interpolation processing section 8 calculates a movement amount of a screw cutting spindle that is proportional to the instructed screw cutting lead, with respect to the rotation amount of the main spindle from a point of time when the shift angle amount reaches 0, and performs movement control in synchronization with the rotation amount of the main spindle, thereby processing a work piece gripped by the main spindle from a shift angle of screw cutting instructed by the program, whereby screw cutting can be performed.

In addition, also for an angle of phase matching of main spindle synchronization control that synchronously controls rotation of opposed main spindles, phase matching of synchronization tapping that synchronously controls rotation of the main spindle and movement of the tapping spindle, main spindle C-axis control that performs positioning, or orientation/indexing control, similarly, it is possible to perform calculation of a phase matching angle or the like on the basis of the Z-phase signal.

Also, in the case of control, for example, a machine having a configuration shown in FIG. 4 by the NC device having the above-described configuration, there is a case where a starting angle of screw cutting is different due to the disposition of the main spindle that grips a work piece on which processing is performed, and a tool. In addition, the machine having the configuration shown in FIG. 4 is made such that the disposition of the main spindle is alternately changed between a main spindle station A 57 and a main spindle station B 58 by the rotation of a main spindle station pivot spindle 59 and simultaneous processing of primary processing at the main spindle station A 57 and secondary processing at the main spindle station B 58 can be performed while delivering a work piece between the main spindle station A and the main spindle station B.

In a machine having such a configuration, since disposition of a main spindle station is switched by the movement of the machine, there is a case where the relationship between a contact angle of a blade edge of a tool and a main spindle angle at which a sensor of an encoder is mounted are different due to the disposition of the main spindle station. In the case of the machine having the configuration shown in FIG. 4, with the disposition of the main spindle station A, an encoder sensor is located at an upper portion. However, with the disposition of the main spindle station B, the encoder sensor is located at a lower portion. If processing is performed by the tools disposed above the respective main spindle stations, in the main spindle station A, screw cutting is started when the Z-phase passes an upper portion of the main spindle, and in the main spindle station B, screw cutting is started when the Z-phase passes a lower portion of the main spindle, whereby a difference arises in the paths of a screw thread which the blade edge of the tool traces.

For this reason, in a case where a screw thread processed at the main spindle station A is reprocessed at the main spindle station B, a screw thread processed at the main spindle station A of FIG. 4 is reprocessed at the main spindle station B by giving instructions of a shift angle (in the case of this machine, 180°) of screw cutting corresponding to the main spindle station in which the main spindle that performs processing is disposed, by the processing program.

Also, as another background art, there is proposed an art in which when performing reprocessing of a screw or a gear, a position that generates a single-revolution signal is shifted by a gear-meshing position by a configuration made such that if a gear-meshing completion signal is generated in a gear-meshing (in the case of reprocessing of a screw, gear-meshing of a screw cutting tool and an already processed screw) completion state, a reversible counter for single-revolution signal (Z-phase signal) generation is reset to be a 0 position by the signal and thereafter, every time the reversible counter counts 4096 pulses, it is returned to a 0 position, thereby generating a single-revolution signal (refer to Patent Document 1).

[Patent Document 1] Japanese Unexamined Patent Application Publication No. S59-232750-A (the 3rd line of the top right column on Page 2 to the 4th line of the top left column on Page 5, and FIGS. 2 and 3)

DISCLOSURE OF INVENTION

Technical Problem

Incidentally, in the art disclosed in the above Patent Citation 1, since pre-work that performs gear-meshing and generates a completion signal is needed in order to shift a main spindle single-revolution reference signal and the reversible counter for generating a Z-phase signal is reset in a state where a main spindle has stopped at a given gear-meshing position, it is not possible to perform correction during rotation. Also, there are drawbacks such as the necessity for dedicated hardware because it is necessary to reset the counter by hardware, the inability to easily change a main spindle single-revolution reference signal, and the inability to easily change a shift amount of the main spindle single-revolution reference signal.

Also, in the existing NC device, in the case of correcting a screw cutting starting point, a main spindle synchronization phase matching command angle, a main spindle angle at the time of the starting of synchronization tapping, a main spindle C-axis zero return position, an orientation/indexing position, and so on, it is necessary to separately perform settings by parameters of the respective operations and a processing program. For this reason, since when switching the main spindle station by turning the main spindle station pivot spindle 59, thereby changing the disposition of the main spindle that grips a work piece, as in FIG. 4, it is necessary to change a plurality of parameters, there are defects in that it is not possible to rotate a main spindle position during rewriting of all relevant parameters and the respective parameters and the processing program must be changed every time the main spindle position is changed.

The present invention has been made in order to solve such problems and has an object to provide an NC device that can easily shift by an arbitrary amount a main spindle single-revolution reference signal without being dependant on hardware and while rotating a main spindle.

Also, an object is to obtain an NC device in which also in operations other than screw cutting, corrections can be performed at once because it is troublesome to separately correct angles by the respective unit (a processing program and a parameter setting unit) corresponding to the used operations, in order to match a phase of a main spindle.

Technical Solution

A numerical control device according to the present invention is a numerical control device in which a single-revolution reference point of a main spindle is determined in accordance with a Z-phase signal of a main spindle encoder that generates one pulse per revolution, and is configured to include a main spindle reference angle correction amount setting unit for inputting a correction angle of the reference point; a main spindle within-single-revolution feed-back position correction unit for correcting the reference point by a correction angle set by the main spindle reference angle correction amount setting unit; and a main spindle within-single-revolution command position correction unit for correcting a main spindle within-single-revolution command position by the correction angle set by the main spindle reference angle correction amount setting unit.

Also, in the numerical control device according to the present invention, the main spindle within-single-revolution FB position correction unit outputs a virtual main spindle Z-phase counter having a reference point of the main spindle corrected on the basis of a feed-back position of the main spindle, a reference point of the main spindle that the Z-phase signal generates, and a correction angle of the reference point.

Also, in the numerical control device according to the present invention, the main spindle within-single-revolution command position correction unit outputs a virtual main spindle within-single-revolution command position counter having a main spindle within-single-revolution command position corrected on the basis of a command position for the main spindle and a correction angle of the reference point.

Also, the numerical control device according to the present invention includes a Z-phase correction flag that determines whether or not it is the timing of changing a correction angle of the reference point, and a screw cutting control section that ignores passage of a Z-phase so as not to detect it after a correction angle of the reference point is changed on the basis of the flag and until it newly passes through an after-correction reference point.

Advantageous Effects

According to the present invention, an NC device can be obtained that can easily shift by an arbitrary amount a main spindle single-revolution reference signal without being dependant on hardware and while rotating a main spindle.

Also, according to the present invention, also in operations other than screw cutting, there is no need to change the respective parameters and a processing program because for operations requiring control of matching the angle of the main spindle, such as phase matching of main spindle synchronization control which performs an operation by synchronizing the speeds of two or more main spindles, main spindle zero return before the starting of synchronization tapping, zero return of C-axis control which performs positioning, main spindle orientation, and indexing, there is no need to separately perform corrections at control sections of the respective operations and the corrections can be performed at once.

EXPLANATION OF REFERENCE

Figure 1:
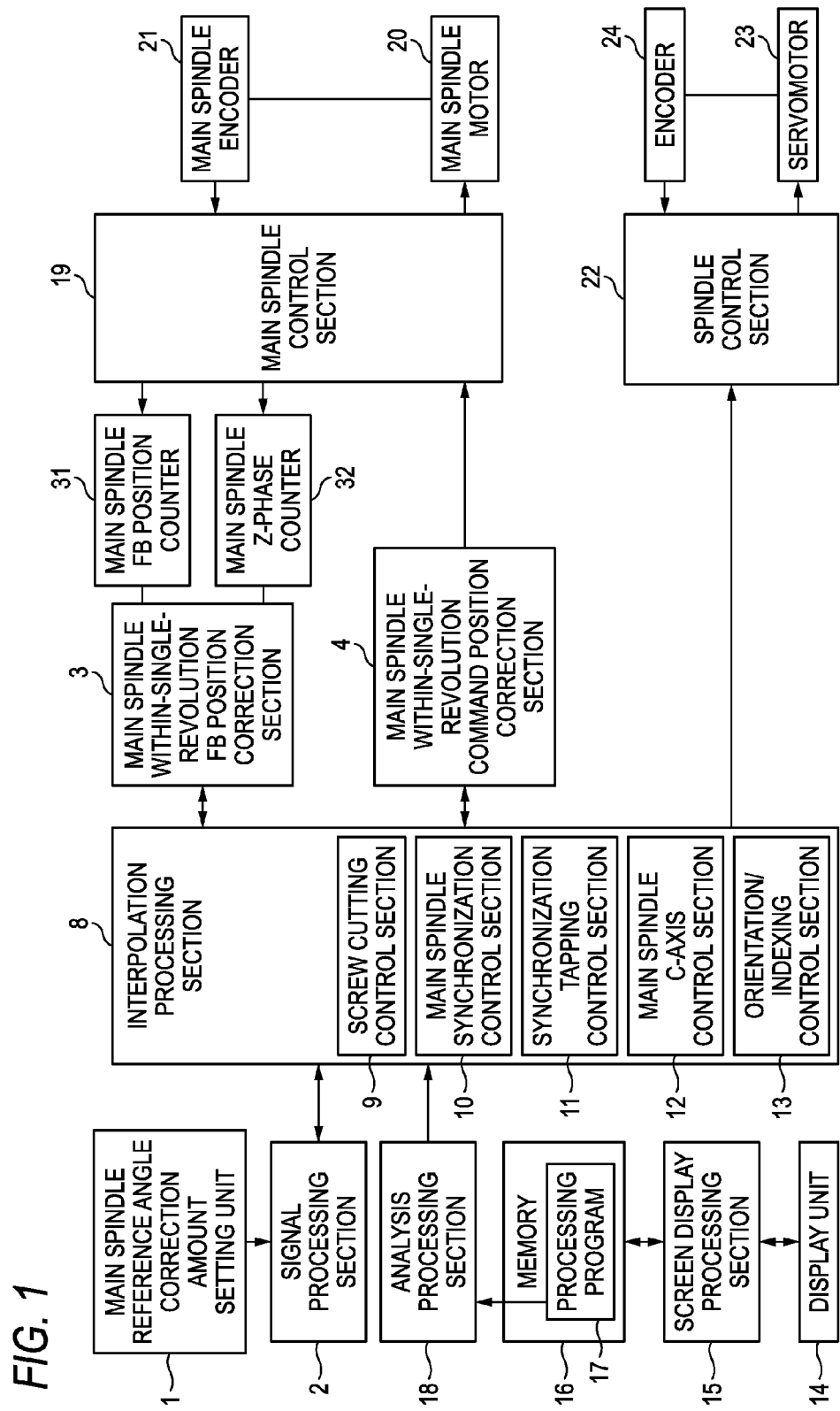
FIG. 1 is a block diagram illustrating the configuration of an NC device related to Example 1 of this invention.

1: main spindle reference angle correction amount setting unit
2: signal processing section
3: main spindle within-single-revolution FB position correction section
4: main spindle within-single-revolution command position correction section
7: phase shift control section
8: interpolation processing section
9: screw cutting control section
10: main spindle synchronization control section
11: synchronization tapping control section
12: main spindle C-axis control section
13: orientation/indexing control section
14: display unit
15: screen display processing section
16: memory
17: processing program
18: analysis processing section
19: main spindle control section
20: main spindle motor
21: main spindle encoder
22: spindle control section
23: servomotor
24: encoder
30: main spindle reference angle correction amount
31: main spindle feed-back position counter
32: main spindle Z-phase counter
33: main spindle feed-back position counter
34: virtual main spindle Z-phase counter
35: main spindle within-single-revolution feed-back position counter
36: virtual main spindle within-single-revolution feed-back position counter
41: main spindle command position counter
42: main spindle command position counter
43: virtual main spindle within-single-revolution command position counter
44: main spindle within-single-revolution command position counter
51: tool A
52: tool B
53: main spindle A encoder sensor
54: main spindle A Z-phase
55: main spindle B encoder sensor
56: main spindle B Z-phase
57: main spindle station 1
58: main spindle station 2
59: main spindle station pivot spindle
61: Z-phase correction flag
63: screw cutting pulse generation unit
64: screw cutting speed generation unit
71: Z-phase reference point
72: after-correction Z-phase reference point

BEST MODE FOR CARRYING OUT THE INVENTION

Example 1

Hereinafter, Example 1 of an NC device related to this invention will be described using FIGS. 1 to 5.

FIG. 1 is a block diagram illustrating the configuration of the NC device related to Example 1 of this invention, 1 denotes a main spindle reference angle correction amount setting unit, 2 denotes a signal processing section, 3 denotes a main spindle within-single-revolution feed-back position correction section (hereinafter referred to as a main spindle within-single-revolution FB position correction section), 4 denotes a main spindle within-single-revolution command position correction section, 8 denotes an interpolation processing section, 9 denotes a screw cutting control section, 10 denotes a main spindle synchronization control section, 11 denotes a synchronization tapping control section, 12 denotes a main spindle C-axis control section, 13 denotes an orientation/indexing control section, 14 denotes a display unit, 15 denotes a screen display processing section, 16 denotes a memory, 17 denotes a processing program, 18 denotes an analysis processing section, 19 denotes a main spindle control section, 20 denotes a main spindle motor, 21 denotes a main spindle encoder, 22 denotes a spindle control section, 23 denotes a servomotor, 24 denotes an encoder, 31 denotes a main spindle feed-back position counter, and 32 denotes a main spindle Z-phase counter.

Figure 2:
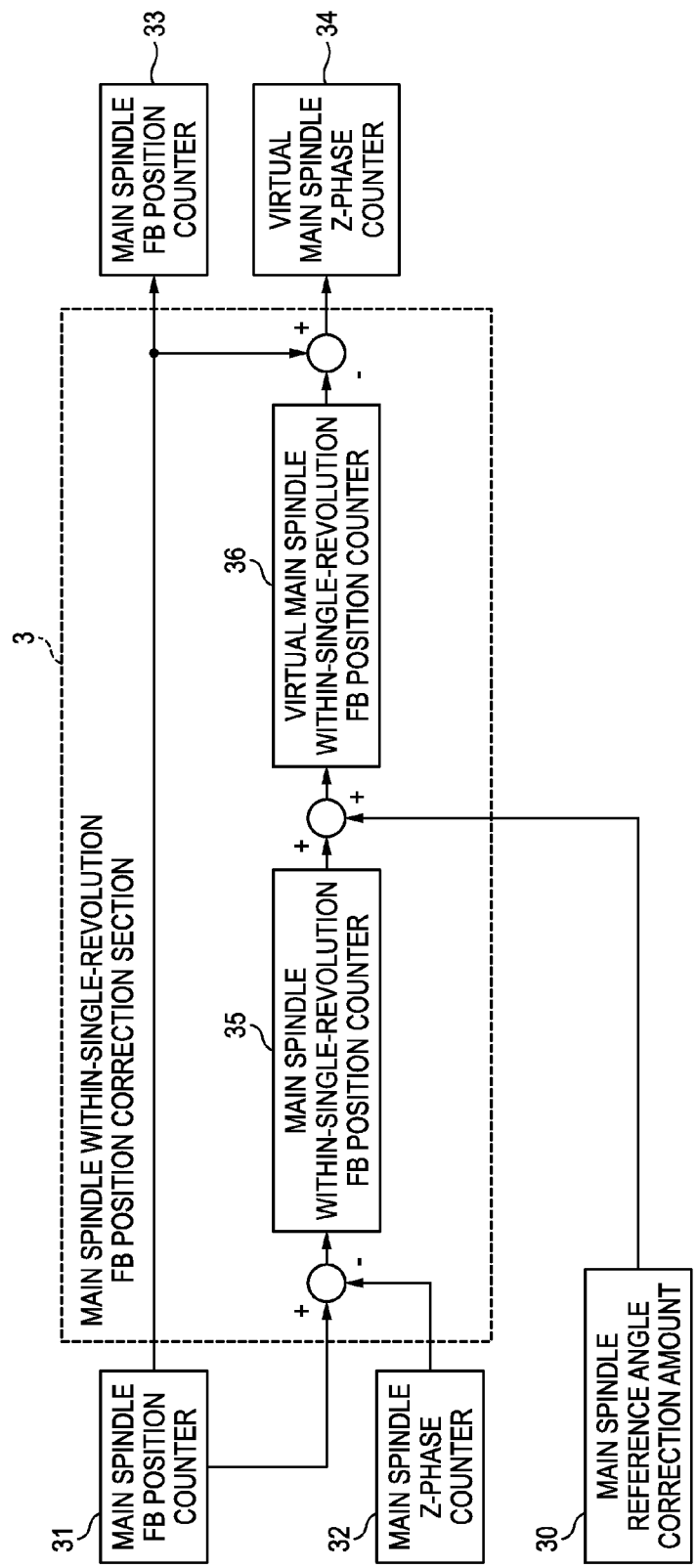
FIG. 2 is a block diagram of a main spindle within-single-revolution FB position correction section shown in FIG. 1.

FIG. 2 is a block diagram of the main section of the main spindle within-single-revolution FB position correction section 3 related to Example 1 of this invention. 30 denotes a main spindle reference angle correction amount of a Z-phase reference point set by the main spindle reference angle correction amount setting unit 1 shown in FIG. 1, 31 denotes the main spindle FB position counter that is calculated by accumulation of a main spindle encoder pulse and shows a main spindle feed-back position, 32 denotes the main spindle Z-phase counter that is generated by latching the value of the main spindle FB position counter 31 when a sensor of the main spindle encoder 21 detects Z-phase passage, and 33 denotes a main spindle feed-back position counter (hereinafter referred to as a main spindle FB position counter) that is calculated as a result of passing through the main spindle within-single-revolution FB position correction section 3 and shows the same value as the main spindle FB position counter 31. 34 denotes a virtual main spindle Z-phase counter that is calculated as a result of passing through the main spindle within-single-revolution FB position correction section 3, 35 denotes a main spindle within-single-revolution feed-back position counter (hereinafter referred to as a main spindle within-single-revolution FB position counter) that is calculated by a difference between the main spindle FB position counter 31 and the main spindle Z-phase counter 32, and 36 denotes a virtual main spindle within-single-revolution feed-back position counter (hereinafter referred to as a virtual main spindle within-single-revolution FB position counter) that is calculated by adding a main spindle reference angle correction amount that is set by the main spindle reference angle correction amount setting unit 1, to the main spindle within-single-revolution FB position counter 35.

That is, the main spindle within-single-revolution FB position correction section 3 is made so as to input the main spindle FB position counter 31 and the main spindle Z-phase counter 32 and output the main spindle FB position counter 33 and the virtual main spindle Z-phase counter 34.

Figure 3:
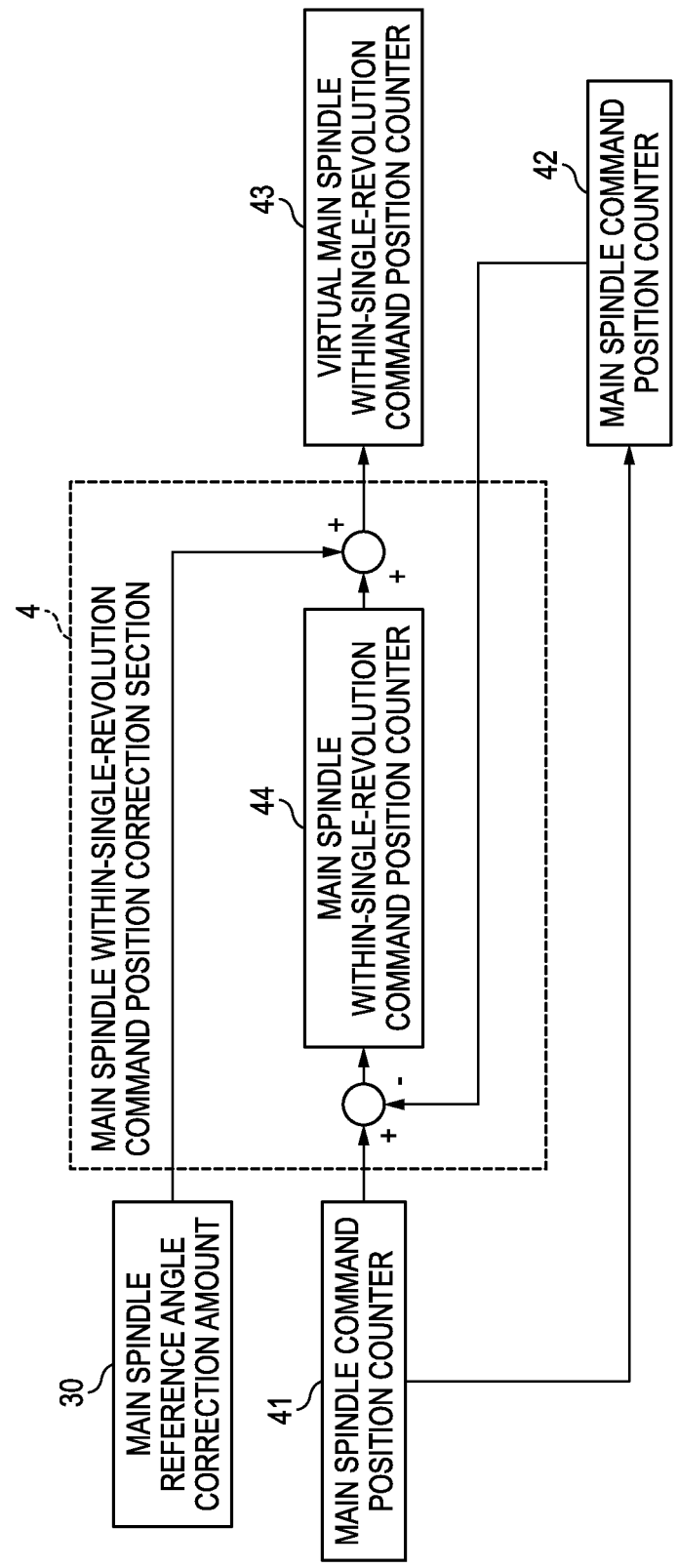
FIG. 3 is a block diagram of a main spindle within-single-revolution command position correction section shown in FIG. 1.

FIG. 3 is a block diagram of a main section of the main spindle within-single-revolution command position correction section 4 related to Example 1 of this invention. 30 denotes the main spindle reference angle correction amount of the Z-phase reference point set by the main spindle reference angle correction amount setting unit 1 of FIG. 1, 41 is a main spindle command position counter that shows a command position which controls a main spindle position, and 42 is a main spindle command position counter that is calculated as a result of passing through the main spindle within-single-revolution command position correction section 4 and shows the same value as the main spindle command position counter 41. 44 is a main spindle within-single-revolution position counter that is calculated by accumulating a variation of the main spindle command position counter 41 and performing rounding off within one revolution, and 43 denotes a virtual main spindle within-single-revolution command position counter that is calculated as a result of passing through the main spindle within-single-revolution command position correction section 4 and obtained by adding the main spindle reference angle correction amount 30 to the value of the main spindle within-single-revolution command position counter 44.

That is, the main spindle within-single-revolution command position correction section 4 is made so as to input the main spindle reference angle correction amount 30 and the main spindle command position counter 41 and output the main spindle command position counter 42 and the virtual main spindle within-single-revolution command position counter 43.

Also, most of the configuration requirements of the NC device are configured by software.

Figure 4:
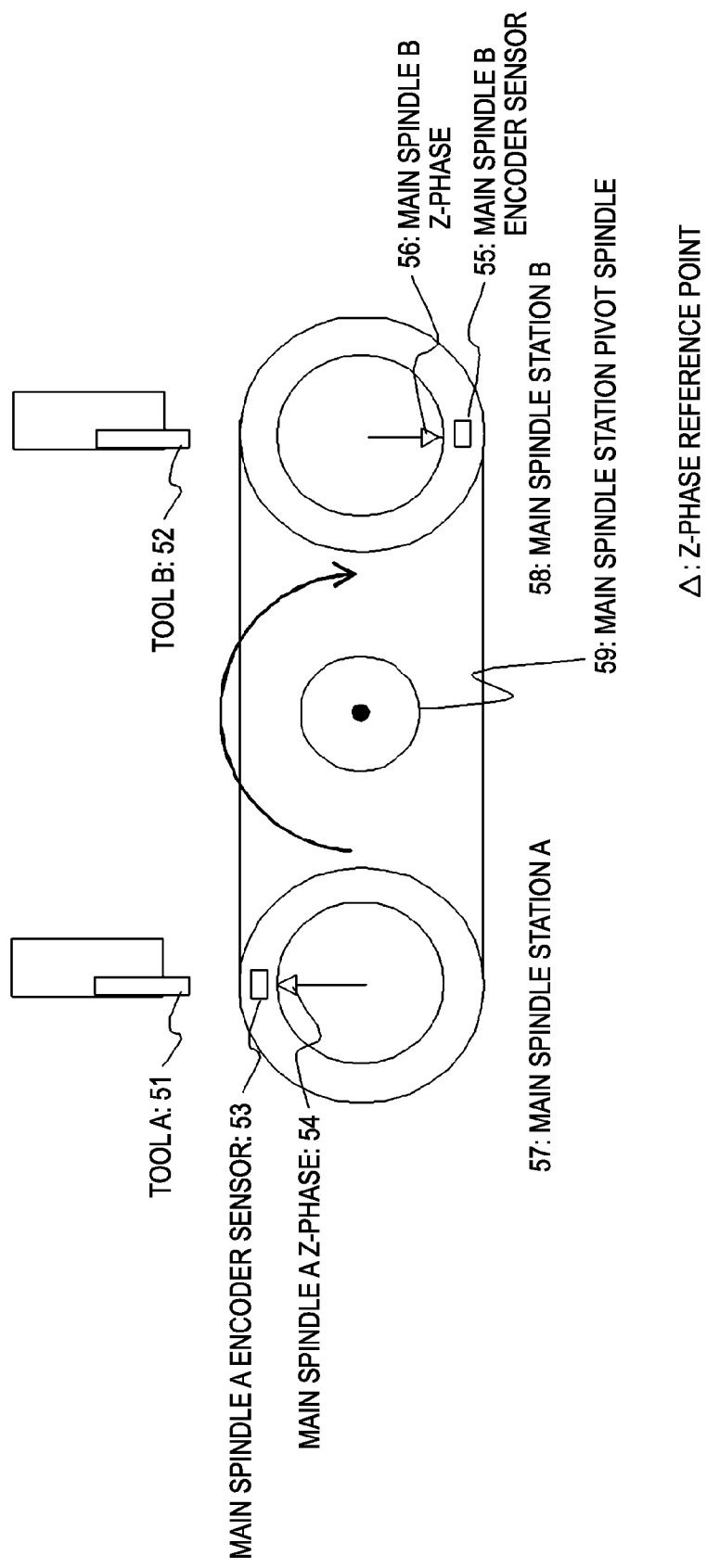
FIG. 4 is a diagram illustrating the configuration of a machine which is controlled by the NC device related to Example 1 of this invention.

FIG. 4 is a diagram illustrating the configuration of a machine that is controlled by the NC device shown in Example 1. In the drawing, 51 denotes a tool A, 52 denotes a tool B, 53 denotes an encoder sensor of a main spindle A, 54 denotes a Z-phase mounted on a rotating body of the main spindle A, 55 denotes an encoder sensor of a main spindle B, and 56 denotes a Z-phase mounted on a rotating body of the main spindle B. 57 denotes a main spindle station A in which a main spindle that grips a work piece which is processed by the tool A is disposed, and 58 denotes a main spindle station B in which a main spindle that grips a work piece which is processed by the tool B is disposed. 59 denotes a main spindle station pivot spindle which turns a headstock having the main spindle A and the main spindle B. The main spindle station pivot spindle 59 rotates, so that the main spindle A and the main spindle B are made to be alternately switched to either the main spindle station A or the main spindle station B.

Next, an operation of the NC device related to Example 1 will be described.

In FIG. 1, the processing program 17 performs an input by operating the display unit 14 and is sent to and stored in the memory 16 by the screen display processing section 15. The processing program 17 is described by a G (preparation) command that gives instructions of a position command and a feed speed such as positioning or cutting feed of the NC device, a coordinate word and an F (feed) command, an S (main spindle) command that gives instructions of the speed for the main spindle, an M (auxiliary) command that gives instructions of an auxiliary function that performs machine control, a T (tool) command that selects a tool, or the like.

The analysis processing section 18 performs analysis processing of the processing program 17 and the interpolation control section 8 which has received the analysis result performs interpolation on the basis of the analysis result. An interpolated interpolation position pulse is sent to the spindle control section 22 that controls a corresponding spindle and a speed command of the main spindle is sent to the main spindle control section 19, whereby operations of the spindle and the main spindle instructed by the processing program are performed.

In the main spindle motor 20, a speed command of a corresponding main spindle is generated in the interpolation processing section 8 by a speed command of the processing program 17 and also a positive rotation signal or a reverse rotation signal corresponding to the main spindle is output to a ladder section (not shown) through the signal setting section 2 and the interpolation processing section 8 by M3 and M4 commands of the processing program 17, whereby control of positive rotation or reverse rotation at a main spindle speed instructed by the main spindle control section 19 is performed.

If the main spindle motor 20 rotates, the main spindle encoder 21 outputs a detected position pulse to the main spindle control section 19. Also, when a Z-phase passes through a sensor of a detector, the main spindle encoder 21 outputs a Z-phase signal. The main spindle control section 19 accumulates a position pulse from the main spindle encoder and creates the main spindle FB position counter 31. Also, when the Z-phase signal has been input, the value of the main spindle FB position counter 31 is latched and the main spindle Z-phase counter 32 is created.

Figure 5:
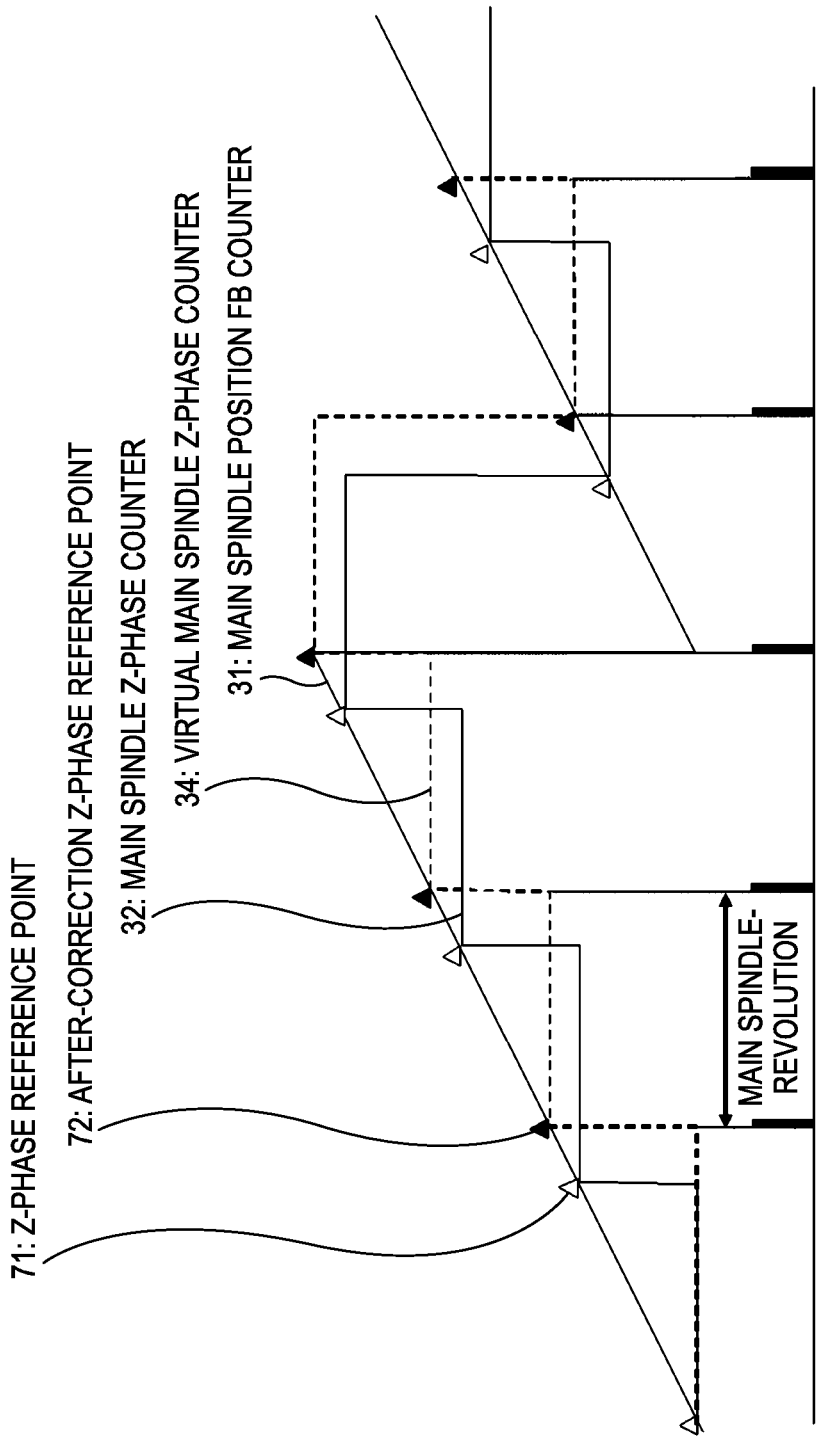
FIG. 5 is a diagram illustrating a Z-phase reference point before and after correction related to Example 1 of this invention.

The main spindle FB position counter 31 and the main spindle Z-phase counter 32 are introduced into the main spindle within-single-revolution FB position correction section 3, as shown in FIG. 2. The main spindle within-single-revolution FB position correction section 3 generates the main spindle within-single-revolution FB position counter 35 from a difference between the main spindle FB position counter 31 and the main spindle Z-phase counter 32. Next, the main spindle reference angle correction amount 30 set by the main spindle reference angle correction amount setting unit 1 is added to the main spindle within-single-revolution FB position counter 35, thereby generating the virtual main spindle within-single-revolution FB position counter 36. The value of the virtual main spindle within-single-revolution FB position counter 36 is subtracted from the main spindle FB position counter 31, thereby generating the virtual main spindle Z-phase counter 34. That is, as shown in FIG. 5, the virtual main spindle Z-phase counter 34 having the after-correction Z-phase reference point in which the actual Z-phase reference point is shifted by the main spindle reference angle correction amount 30 set by the main spindle reference angle correction amount setting unit 1 is generated. In addition, FIG. 5 is a timing chart diagram relating to a correction of the Z-phase reference point, 71 denotes the Z-phase reference point that is detected by Z-phase passage of the main spindle encoder, and 72 denotes the after-correction Z-phase reference point in which the virtual main spindle Z-phase counter corrected by the main spindle reference angle correction amount 30 becomes a position of 0.

Also, the main spindle FB position counter 33 is output from the main spindle FB position counter 31. Then, the interpolation processing section 8 takes the main spindle FB position counter 33 and the virtual main spindle Z-phase counter 34 from the main spindle single-revolution FB position correction section 3.

For example, when the NC device executes a screw cutting command program, the screw cutting control section 9 regards a point shifted with respect to the actual Z-phase reference point by an angle of the main spindle reference angle correction amount 30 input by the main spindle reference angle correction amount setting unit 1, as the after-correction Z-phase reference point, from a difference between the main spindle FB position counter 33 and the virtual main spindle Z-phase counter 34, recognizes passage of a Z-phase position by a change in the value of the virtual main spindle Z-phase counter 34, and calculates a rotation amount of the main spindle in the first Z-phase passage. Thereafter, a variation of the main spindle FB position counter 31 is accumulated, whereby a rotation amount of the main spindle from the first Z-phase passage after screw cutting command is calculated. The interpolation processing section 8 calculates a movement amount of a screw cutting spindle, which is proportional to an instructed screw cutting lead, with respect to the rotation amount of the main spindle from the Z-phase passage and performs processing from a given angle of a work piece gripped by the main spindle by controlling movement in synchronization with the rotation amount of the main spindle, whereby screw cutting is performed. The given angle at this time can be set to be an angle shifted by the main spindle reference angle correction amount 30 with respect to the Z-phase reference point mounted on the main spindle encoder.

Also, similarly, in a case where the NC device performs main spindle synchronization control in which two or more of main spindles perform processing in synchronization, if a main spindle synchronization position command of a reference main spindle is instructed, position control synchronized with rotation of the reference main spindle is performed and rotation at a speed synchronized with the reference main spindle is performed, whereby a state during main spindle synchronization control is created. When a command matching a phase of main spindle synchronization has been given, the main spindle synchronization control section 10 matches a phase such that Z-phase reference points of the reference main spindle and a synchronization main spindle are at the same position. At this time, by performing phase matching on the basis of the virtual main spindle Z-phase counters 34 of two synchronized main spindles, it is possible to perform phase matching between the after-correction Z-phase reference points, each of which is at an angle shifted by the main spindle reference angle correction amount 30 with respect to the Z-phase reference point mounted on the main spindle encoder, of the respective synchronized main spindles.

Also, when a command to the main spindle has been given, the interpolation processing section 8 creates the main spindle command position counter 41 that is output to the main spindle control section 19, and first inputs it to the main spindle within-single-revolution command position correction section 4. As shown in FIG. 3, the main spindle within-single-revolution command position correction section 4 creates the main spindle within-single-revolution command position counter 44 by accumulating a variation of the main spindle command position counter 41 and calculating a value rounded off within one revolution. Next, the virtual main spindle within-single-revolution command position counter 43 is created by adding the main spindle reference angle correction amount 30 input by the main spindle reference angle correction amount setting unit 1, to the main spindle within-single-revolution command position counter 44 and calculating a value rounded off within one revolution. Also, the main spindle command position counter 42 is output to the input main spindle command position counter 41.

For example, when the NC device executes a synchronization tapping command program, by performing tapping processing by synchronously controlling a tapping main spindle and a tapping spindle (NC spindle) at the time of tapping, high-precision tapping processing is performed without using a floating tap chuck or the like. In a case where a main spindle zero return method has been instructed in a synchronization tapping command, zero return of the tapping main spindle is performed before the start of cutting, and after angles thereof are matched to each other, the tapping main spindle and the tapping spindle (feed spindle) perform tapping processing in synchronization. The synchronization tapping control section 11 can perform zero return of the tapping main spindle on the basis of the after-correction Z-phase reference point that is at an angle shifted by the main spindle reference angle correction amount 30 with respect to the Z-phase reference point mounted on the main spindle encoder of the tapping main spindle, by calculating a movement amount of the main spindle with a position, at which the virtual main spindle within-single-revolution command position counter 43 becomes 0, as a target angle and performing zero return of the tapping main spindle.

Similarly, when the NC device executes a main spindle C-axis command and switches the main spindle to C-axis control (position control), a coordinate system of a C-axis is established by zero return of the main spindle to a given angle. The main spindle C-axis control section 12 can establish the coordinate system of the C-axis by performing zero-return of the main spindle to a given angle based on the after-correction Z-phase reference point that is at an angle shifted by the main spindle reference angle correction amount 30 with respect to the Z-phase reference point mounted on the main spindle encoder of the main spindle, by calculating a movement amount of the main spindle on the basis of a position, at which the virtual main spindle within-single-revolution command position counter 43 becomes 0, and performing zero return of the main spindle.

Similarly, when the NC device executes an orientation/indexing command, in order to position the main spindle at a given angle, the orientation/indexing control section 13 can position the main spindle at a given angle based on the after-correction Z-phase reference point that is at an angle shifted by the main spindle reference angle correction amount 30 with respect to the Z-phase reference point mounted on the main spindle encoder of the main spindle, by calculating a movement amount of the main spindle with a position, at which the virtual main spindle within-single-revolution command position counter 43 becomes 0, as a target angle and performing positioning of the main spindle.

Also, in the case of controlling the machine shown in FIG. 4 by the above-described NC device, after the main spindle A is disposed at the position of the main spindle station A 57 and a work piece gripped by the main spindle A is processed by the tool A 51, in order to process the work piece gripped by the main spindle A by the tool B 59, the main spindle station pivot spindle 59 is rotated, thereby performing switching of the disposition of the main spindle A to the position of the main spindle station B 58. At this time, since the mounting angle of the main spindle B encoder sensor 55 in the main spindle station B 58 becomes a direction that differs by 180 degrees with respect to the mounting angle of the main spindle A encoder sensor 53 in the main spindle station A 57, the main spindle reference angle correction amount of 180 degrees is set by the main spindle reference angle correction amount setting unit 1. By this setting, in an action of the main spindle within-single-revolution FB position correction section 3, while the encoder sensor 55 faces the bottom at the disposition of the main spindle station B 58, control of the main spindle based on the direction of the tool B 59 can be performed without being dependant on the actual mounting direction of a detector, on the basis of the angle of the direction of an upper portion of the main spindle station B 58, by regarding a 180-degree shifted position as the after-correction Z-phase reference point.

Accordingly, in a machine in which the actual mounting direction of a detector is changed by disposition switching or the like of the machine, by setting the main spindle reference angle correction amount from the main spindle reference angle correction amount setting unit 1, not from the processing program, in accordance with a change in disposition, it is possible to perform a correction such that the main spindle within-single-revolution reference point becomes an arbitrary angle according to the disposition of the machine, without being dependant on the actual mounting direction of the detector.

Also, according to Example 1, since a configuration is made such that a virtual main spindle Z-phase counter is generated based on the existing main spindle FB position counter and main spindle Z-phase counter, it is possible to easily shift by an arbitrary amount a main spindle single-revolution reference signal without accompanying addition or a change in hardware and while rotating the main spindle.

Further, also in operations other than screw cutting, since for operations requiring control of matching the angle of the main spindle, such as phase matching of main spindle synchronization control which performs an operation by synchronizing the speeds of two or more main spindles, main spindle zero return before the starting of synchronization tapping, zero return of C-axis control which performs positioning, main spindle orientation, and indexing, there is no need to separately perform corrections at control sections of the respective operations and the corrections can be performed at once, there is no need to change the respective parameters and the processing program.

Also, when performing screw cutting by the NC device, screw cutting processing cannot be started after a screw cutting command is executed and until the main spindle passes through the Z-phase, so that a rotation amount of the main spindle exceeds the instructed shift angle. For this reason, in a case where a screw cutting command has been executed just after the main spindle passes through the Z-phase, since screw cutting processing cannot be started until it is over the instructed shift angle in addition to one revolution until the next Z-phase passage, delay in processing time, or the time of a state where a blade edge of a tool comes into contact with a work piece becomes long, so that there is also a problem of adversely affecting the life of the tool. However, according to Example 1, since screw cutting can be started when passage of a corrected main spindle within-single-revolution reference point has been performed after a screw cutting command, a screw cutting start angle does not have to be shifted after waiting for the passage of a Z-phase signal, so that the processing time can be reduced.

Example 2

Next, Example 2 of this invention will be described using FIGS. 5 to 7.

Also, Example 2 is a further improvement of the screw cutting control shown in Example 1.

Figure 6:
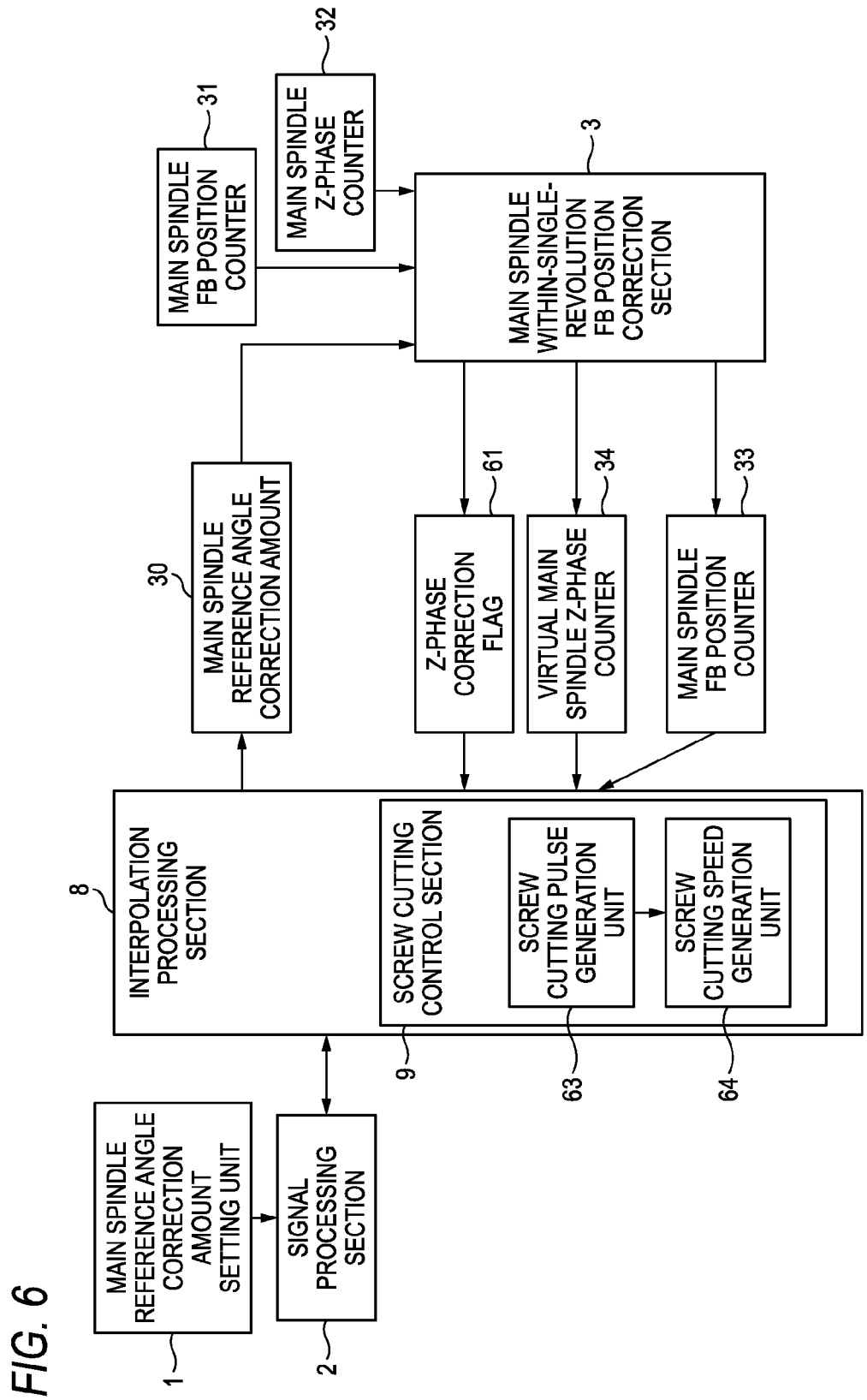
FIG. 6 is a block diagram illustrating the configuration of an NC device related to Example 2 of this invention.

FIG. 6 illustrates an NC device related to Example 2 of this invention, and in the drawing, 1 denotes the main spindle reference angle correction amount setting unit, 2 denotes the signal processing section, 3 denotes the main spindle within-single-revolution FB position correction section, 8 denotes the interpolation processing section, 9 denotes the screw cutting control section, 63 denotes a screw cutting pulse generation unit, and 64 denotes a screw cutting speed generation unit. Also, 31 denotes the main spindle FB position counter, 32 denotes the main spindle Z-phase counter, 30 denotes the main spindle reference angle correction amount, 61 denotes a Z-phase correction flag, 33 denotes the main spindle FB position counter, and 34 denotes the virtual main spindle Z-phase counter.

Next, an operation of the NC device related to Example 2 will be described.

That is, the main spindle reference angle correction amount for correcting the Z-phase reference point is set by the main spindle reference angle correction amount setting unit 1 and sent to the interpolation processing section 8.

In the main spindle within-single-revolution FB position correction section 3, the virtual main spindle Z-phase counter 34 is calculated from the main spindle FB position counter 31, the main spindle reference angle correction amount 30, and the main spindle Z-phase counter 32. Also, the Z-phase correction flag 61 is turned on at the moment when the value of the main spindle reference angle correction amount 30 is changed.

In the screw cutting speed generation unit 64, a screw cutting speed is calculated from a screw cutting pulse.

In the screw cutting control section 9, the passage of a Z-phase position is recognized by a change in the value of the virtual main spindle Z-phase counter 34. However, in a case where the value of the main spindle reference angle correction amount from the main spindle reference angle correction amount setting unit 1 has been changed, the value of the virtual main spindle Z-phase counter 34 is changed by a change in the value of the main spindle reference angle correction amount 30. For this reason, in the screw cutting pulse generation unit 63, a screw cutting pulse is calculated by catching a change in the virtual main spindle Z-phase counter 34 when the Z-phase correction flag 61 is not turned on, that is, when the main spindle reference angle correction amount is not changed, such that the passage and false detection of the after-correction Z-phase reference point are not performed by a change in the value of the virtual main spindle Z-phase counter 34 at the moment when the main spindle reference angle correction amount is changed. Accordingly, screw cutting can be started from the passage of the next after-correction Z-phase reference point after a change in the main spindle reference angle correction amount.

Figure 7:
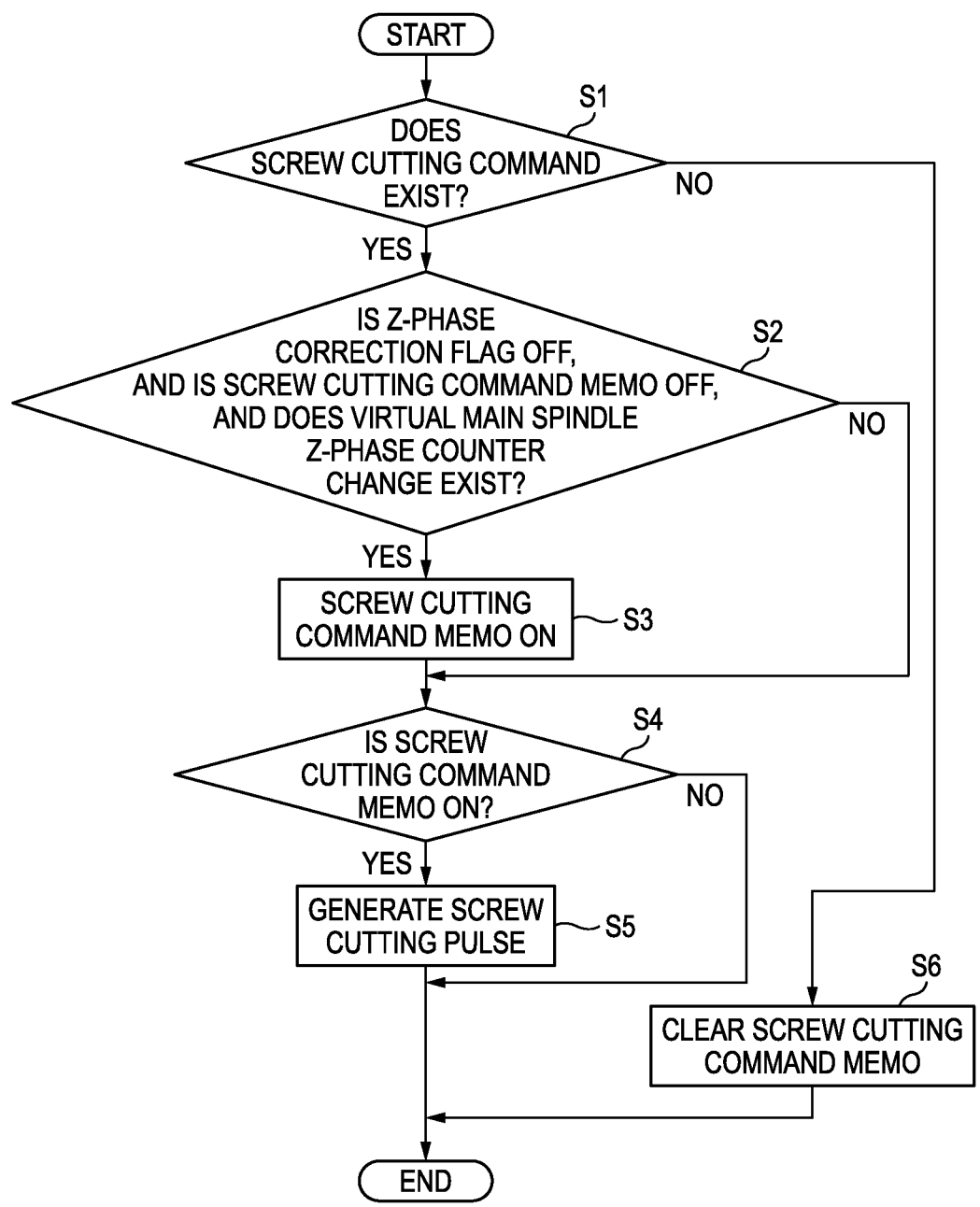
FIG. 7 is a flowchart illustrating an operation of the NC device related to Example 2 of this invention.
Figure 8:
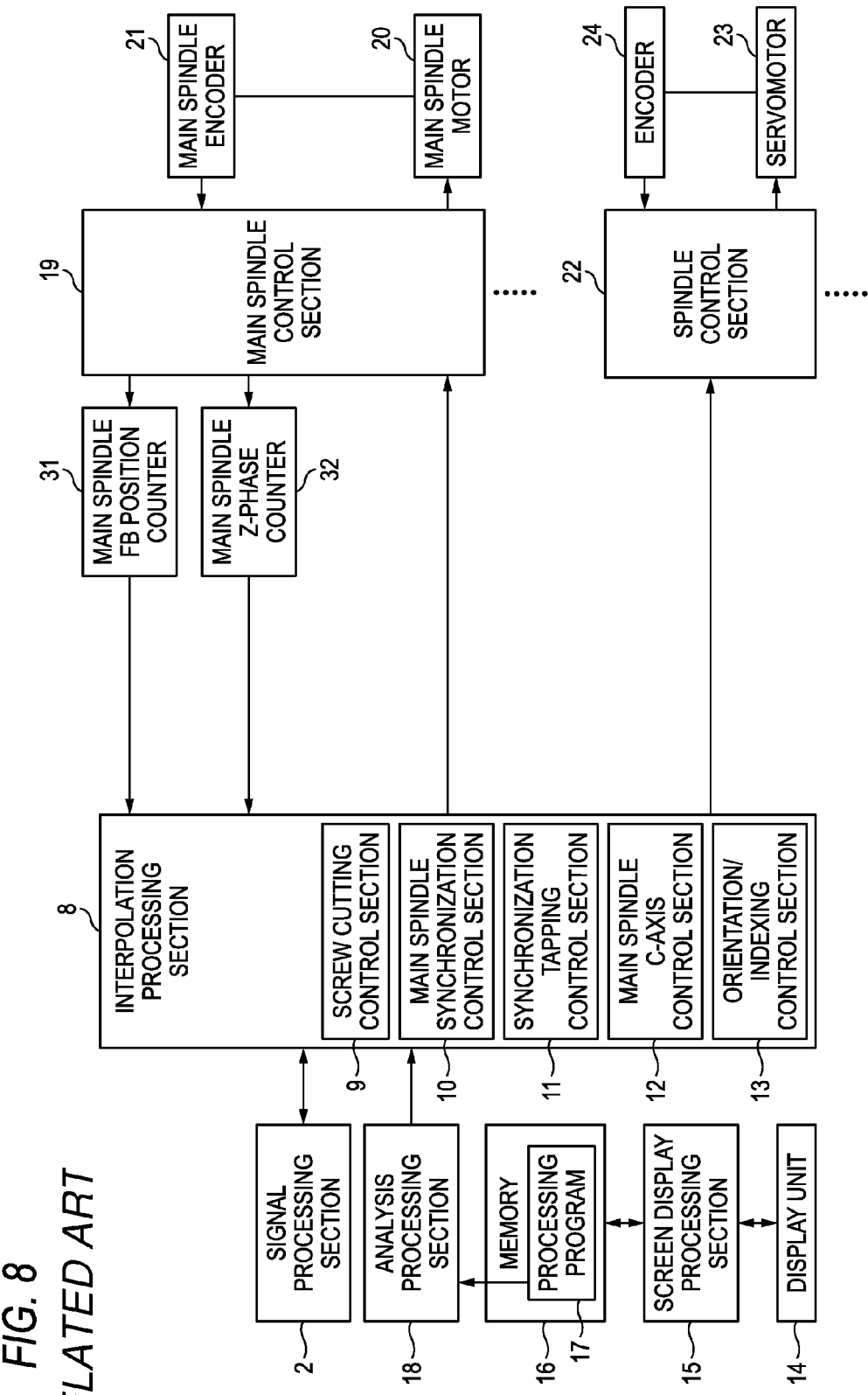
FIG. 8 is a block diagram illustrating the configuration of an existing NC device.
Figure 9:
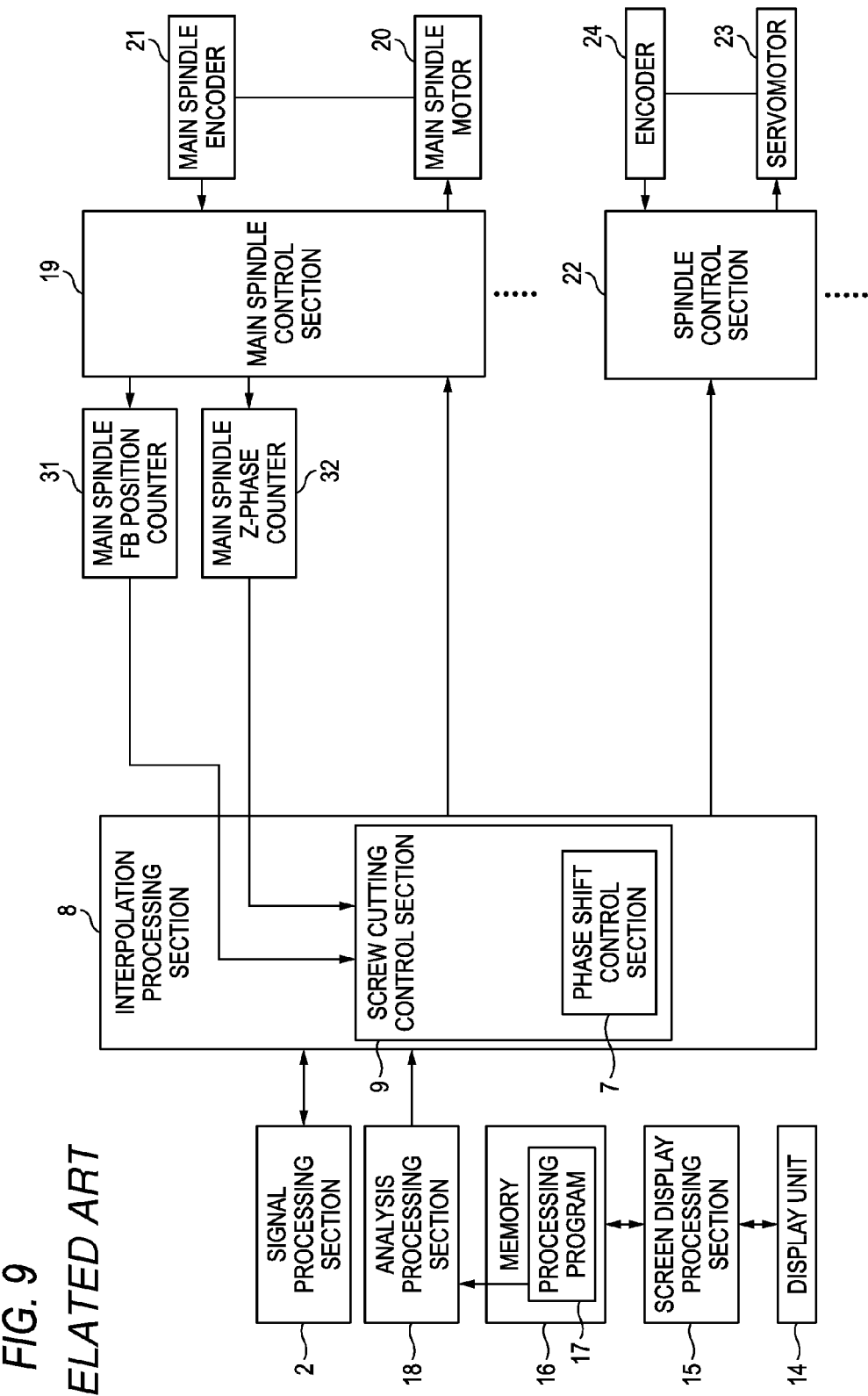
FIG. 9 is a block diagram illustrating the details of a screw cutting control section of the NC device shown in FIG. 8.
Figure 10:
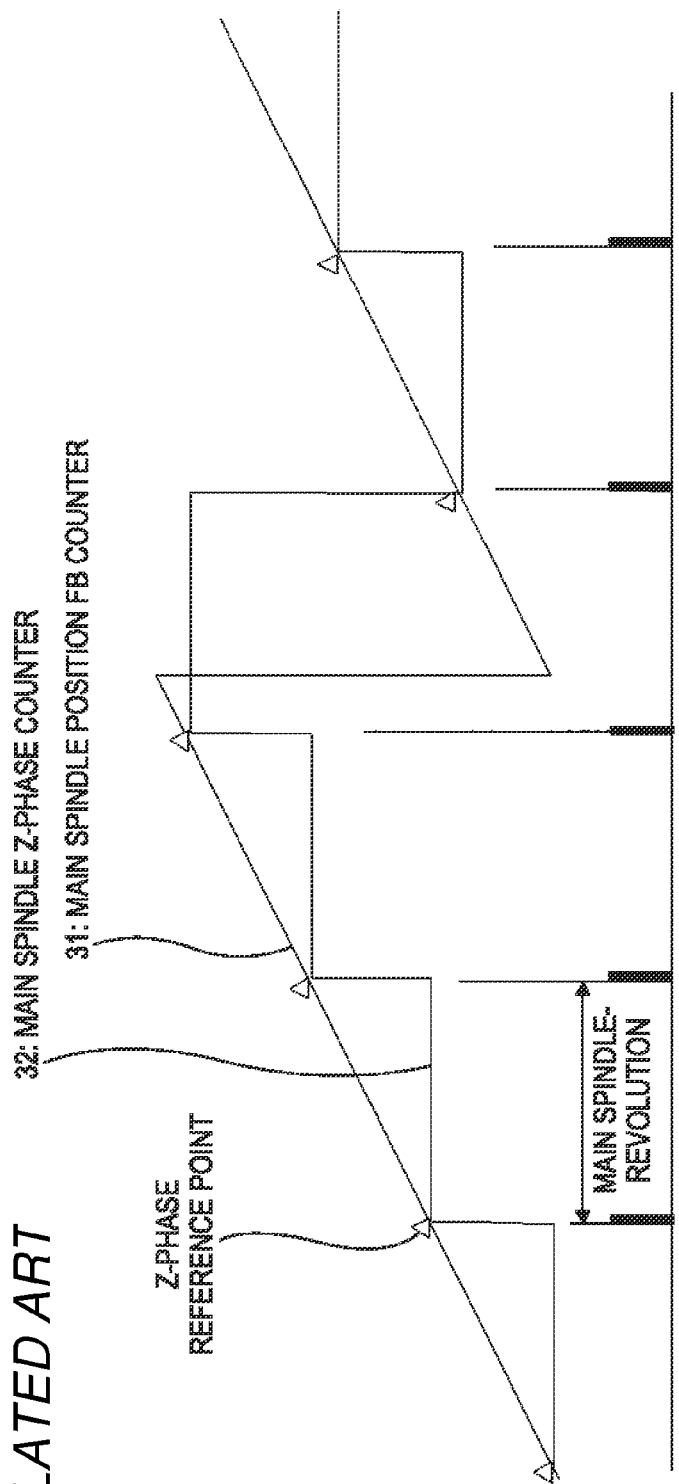
FIG. 10 is a diagram for describing operations of a main spindle position FB counter and a main spindle Z-phase counter.

FIG. 7 is a flowchart showing a process example for generating the screw cutting pulse without regard for a change in the virtual main spindle Z-phase counter 34 when the above-described main spindle reference angle correction amount has been changed.

First, in Step 1, it is checked whether or not a screw cutting command exists. In Step 1, in a case where it is the screw cutting command, the process is branched to Step 2, and if it is not the screw cutting command, the process proceeds to Step 6 and is then ended.

In Step 2, it is checked whether or not the Z-phase correction flag 61 is OFF, that is, it is not the timing when the main spindle reference angle correction amount is changed, and whether or not it is the first time after a screw cutting command (screw cutting command memo is OFF), and whether or not a change in the virtual main spindle Z-phase counter 61 exists. If Step 2 is YES, the process proceeds to Step 3, and if it is NO, the process is branched to Step 4.

In Step 3, the screw cutting command memo is made to be ON.

In Step 4, it is checked whether or not the screw cutting command memo is ON. If it is YES, that is, if the screw cutting command memo is ON, the process proceeds to Step 5, and if it is NO, the process is ended.

In Step 5, the Z-phase correction flag is made to be OFF and also the screw cutting pulse is generated based on a main spindle rotation amount from the virtual main spindle Z-phase counter 61, and the process is then ended.

In Step 6, the screw cutting command is cleared and the process is then ended.

Even if the main spindle within-single-revolution reference point is corrected by doing as described above, since the main spindle within-single-revolution reference point can be corrected without detecting the next Z-phase passage after a change in the main spindle reference angle correction amount, it is possible to correctly perform screw cutting even if the main spindle within-single-revolution reference point is corrected during the rotation of the main spindle.

INDUSTRIAL APPLICABILITY

The NC device related to this invention is suitable for main spindle control of screw cutting, zero return, phase matching, or the like.

The invention claimed is:

1. A numerical control device in which a single-revolution reference point of a main spindle is determined in accordance with a Z-phase signal of a main spindle encoder that generates one pulse per revolution, the numerical control device comprising:
a main spindle reference angle correction amount setting unit for inputting a correction angle of the reference point;
a main spindle within-single-revolution feedback position correction unit for correcting the reference point based on the correction angle input by the main spindle reference angle correction amount setting unit; and
a main spindle within-single-revolution command position correction unit for correcting a main spindle within-single-revolution command position based on the correction angle input by the main spindle reference angle correction amount setting unit,
wherein
the main spindle within-single-revolution feedback position correction unit outputs a virtual main spindle Z-phase counter having the reference point of the main spindle corrected on the basis of a feedback position of the main spindle, the reference point of the main spindle that the Z-phase signal generates, and the correction angle of the reference point.

2. A numerical control device in which a single-revolution reference point of a main spindle is determined in accordance with a Z-phase signal of a main spindle encoder that generates one pulse per revolution, the numerical control device comprising:
a main spindle reference angle correction amount setting unit for inputting a correction angle of the reference point;
a main spindle within-single-revolution feedback position correction unit for correcting the reference point based on the correction angle input by the main spindle reference angle correction amount setting unit; and
a main spindle within-single-revolution command position correction unit for correcting a main spindle within-single-revolution command position based on the correction angle input by the main spindle reference angle correction amount setting unit,
wherein
the main spindle within-single-revolution command position correction unit outputs a virtual main spindle within-single-revolution command position counter having the main spindle within-single-revolution command position corrected on the basis of a command position for the main spindle and the correction angle of the reference point.

3. A numerical control device in which a single-revolution reference point of a main spindle is determined in accordance with a Z-phase signal of a main spindle encoder that generates one pulse per revolution, the numerical control device comprising:
a main spindle reference angle correction amount setting unit for inputting a correction angle of the reference point;
a main spindle within-single-revolution feedback position correction unit for correcting the reference point based on the correction angle input by the main spindle reference angle correction amount setting unit; and
a main spindle within-single-revolution command position correction unit for correcting a main spindle within-single-revolution command position based on the correction angle input by the main spindle reference angle correction amount setting unit,
wherein
a Z-phase correction flag that determines whether or not it is the timing of changing a correction angle of the reference point, and a screw cutting control section that ignores passage of a Z-phase so as not to detect it after a correction angle of the reference point is changed on the basis of the flag and until it newly passes through an after-correction reference point are provided.

* * * * *